US004001777B2

United States Statutory Invention Registration [19]

[11] Reg. Number: H1777

[45] Published: Feb. 2, 1999

Colby

[54] METHOD AND APPARATUS FOR BOTTLE CAPPING

[75] Inventor: Scot Colby, Rolling Meadows, Ill.

[73] Assignee: Fuji Hunt Photographic Chemicals, Inc., Allendale, N.J.

[21] Appl. No.: 859,363

[22] Filed: May 20, 1997

[51] Int. Cl.[6] ..... B65B 7/28

[52] U.S. Cl. ..... 53/331.5

[58] Field of Search ..... 53/490, 317, 331.5, 53/305, 390, 361, 362

[56] References Cited

U.S. PATENT DOCUMENTS

| | | | |
|---|---|---|---|
| 476,712 | 6/1892 | Wickham | 53/317 |
| 1,208,529 | 12/1916 | Evans | 53/317 X |
| 2,097,022 | 10/1937 | Donahue | 53/490 |
| 2,162,445 | 6/1939 | Richel | 53/317 X |
| 3,031,822 | 5/1962 | Dimond | 53/317 |
| 3,906,706 | 9/1975 | Conti | 53/331.5 |
| 3,984,965 | 10/1976 | Sonnenberg | 53/331.5 |
| 4,222,215 | 9/1980 | Takano | 53/331.5 |
| 4,446,673 | 5/1984 | Desthieux | 53/390 X |
| 4,658,565 | 4/1987 | Westbrook et al. | 53/308 |
| 4,716,772 | 1/1988 | Bubeck et al. | 73/862.23 |
| 4,794,801 | 1/1989 | Andrews et al. | 73/862.23 |
| 5,148,652 | 9/1992 | Herzog | 53/390 X |
| 5,157,897 | 10/1992 | McKee et al. | 53/308 |
| 5,437,139 | 8/1995 | Martin | 53/331.5 X |

*Primary Examiner*—Charles T. Jordan
*Assistant Examiner*—Meena Chelliah
*Attorney, Agent, or Firm*—Sughrue, Mion, Zinn, Macpeak & Seas

[57] ABSTRACT

A torque wrench for manually applying a screw cap on a threaded opening of a container. The torque wrench includes a handle portion which engages a dome s that releasably receives a neck ring insert. The insert engages the cap and applies a consistent amount of torque thereto by the use of a draft angle or curved portion on an inner surface which tightly engages the curved top edge of the cap. The insert may be sized to accommodate different sized caps.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR BOTTLE CAPPING

BACKGROUND OF THE INVENTION

1. Field of the Invention

The present invention relates to capping of bottles and, more particularly, a torque wrench for applying a predetermined amount of torque to a cap when placing the cap on a bottle.

2. Description of the Related Art

Automated capping machines for applying screw-on caps are known. See, for example, U.S. Pat. Nos. 4,658,565, 3,906,706, 4,222,215, 5,151,897, 3,984,965 and 3,031,822. See also U.S. Pat. Nos. 4,716,772 and 4,794,801, regarding torque evaluators. Manual torque wrenches are also known and, of course, caps may be applied by hand without the assistance of a wrench. It will be appreciated, however, that placing caps on bottles by hand without any tool is not very effective and is very inconsistent.

SUMMARY OF THE INVENTION

An object of the invention is to provide a torque wrench which can be used to apply a cap manually to a bottle or the like container in an effective manner with a consistent amount of torque.

This objective, and other objectives, are achieved by providing a torque wrench for applying a screw-on cap to a threaded opening of a container, the torque wrench including a handle for turning them wrench, a cap receiving dome releasably engaged by the handle and an annular-shaped neck ring insert. The dome includes at one end a continuous outwardly extending and annular shaped wall having an inner surface which defines a recess. The neck ring insert is received in the recess defined by the inner surface of the dome and includes inner and outer surfaces, the outer surface releasably engaging the inner surface of the dome wall, and the inner surface of the insert releasably engaging the screw-on cap such that torque applied to the handle is effectively and consistently transmitted through the dome and annular neck ring insert to the cap. Significantly, the inner surface of the annular neck ring insert has an upper curved portion for tightly engaging an upper curved portion of the cap, and thus tightly engaging the cap in general.

BRIEF DESCRIPTION OF THE DRAWINGS

Other features and advantages of the present invention will become apparent when the following description is read in conjunction with the accompanying drawings, in which.

DETAILED DESCRIPTION OF THE PREFERRED EMBODIMENTS

Figure 1:
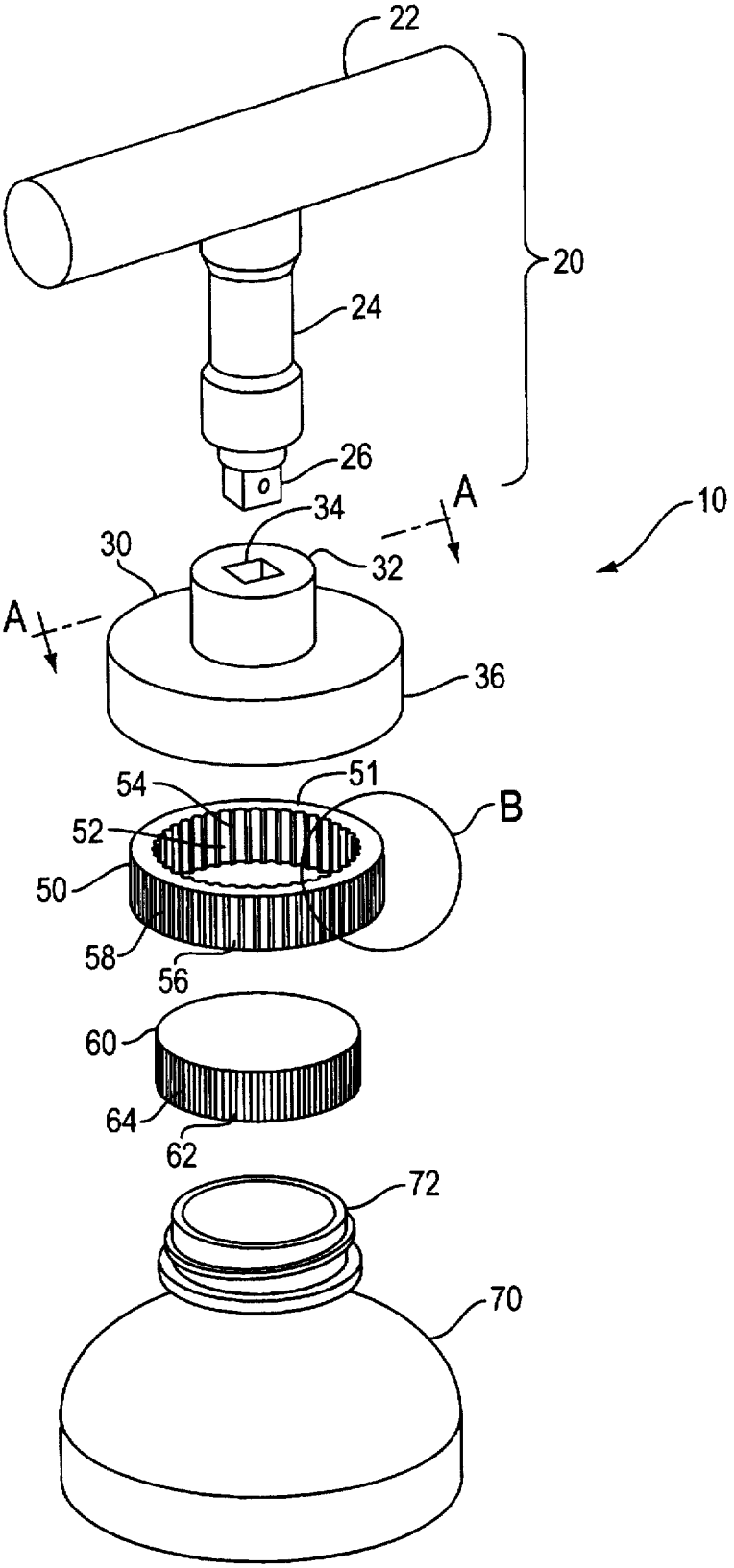
FIG. 1 is an exploded, perspective view of a torque wrench in accordance with the present invention.

Referring now to the drawings wherein like numbers indicate like elements, there is shown in FIG. 1 a torque wrench in accordance with the principles of the invention and designated generally as 10. Torque wrench 10 includes handle 20, dome 30 and neck ring insert 50.

Handle 20 includes a generally laterally extending gripping portion 22 connected to a downwardly extending portion 24 which includes at a free end thereof an engagement device 26, such as the male portion of a socket wrench.

Dome 30 includes a mating engagement device 32 including aperture 34, such as the female portion of a socket wrench, for receiving engagement device 26 of handle 20. of course, other suitable engagement devices for mating handle 20 and dome 30 will be apparent to one skilled in the art, and are within the scope of the present invention. Moreover, handle 20 and dome 30 could be manufactured as one piece.

Figure 2:
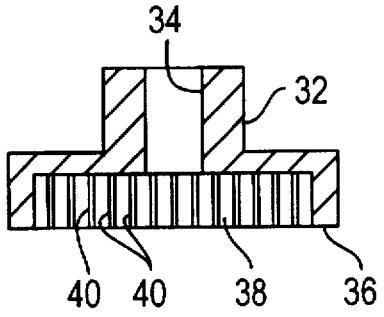
FIG. 2 is a cross-sectional view of a dome portion of the torque wrench of FIG. 1 taken along lines A—A thereof.

Dome 30 also includes a continuous, circular or, annular shaped wall 36 extending generally outward and away from engagement portion 32, as better seen in the cross-sectional view of FIG. 2. Wall 36 includes a continuous inner surface 38 which has generally vertically extending ribs or serrations for engaging an outer surface of neck ring insert 50, as will be discussed in more detail below. It will be understood that engagement portion 32 may be absent in which case any engagement portion may be used including, for example, a shaped hole in wall 36 matching an adaptively shaped projection on handle 20.

Neck ring insert 50 is an annularly shaped element and includes a continuous inner surface 52 having generally vertically extending ribs or serrations 54 for engaging screw-on cap 60, more specifically ribs 64 on outer wall 62 of cap 60. Neck ring insert 50 also includes a continuous outer surface 56 having generally vertically extending ribs or serrations 58 for mating with ribs or serrations 40 on inner surface 38 of dome 30. Neck ring insert 50 may alternatively have a cylindrical or conical inner surface 52. The conical inner surface is shaped so that the radius of the annularly shaped element is smaller at its top surface 51 than its bottom surface 50 for tightly engaging an adaptively shaped bottle cap. Also, it will be appreciated, that insert 50 and dome 30 may be fixedly engaged by any suitable arrangement other than the serrations discussed aboveincluding, but not limited to, a friction grip, screw threads, axially or laterally dispersed screws, clips, etc.

Of course, one skilled in the art will recognize that any suitable arrangement may be used to fixedly engage dome 30 and neck ring insert 50, with specific means other than that which is discussed herein being apparent to one skilled in the art and within the scope of the present invention.

Figure 3:
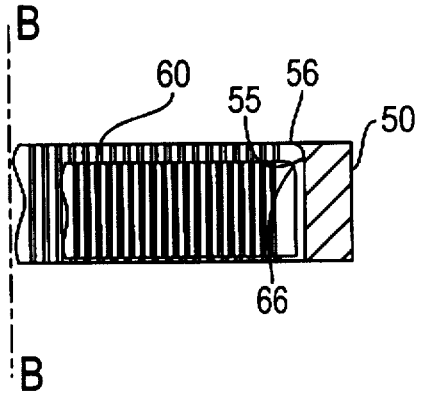
FIG. 3 is a cross-sectional view of the portion of the annular neck ring insert of the torque wrench contained in circle B of FIG. 1, showing also a portion of the cap located therein.

Referring to FIG. 3, neck ring insert 50 includes a curved portion or draft angle 55 at an upper location of inner surface 52 at or near top surface 51 of insert 50 which enables insert 50 to tightly engage screw cap 60 which typically includes an upper rounded edge 66. Curved portion 55 extends inward to a center longitudinal axis B—B of insert 50, as shown in FIG. 3, and forms a lip 56 which overhangs cap 60 when torque wrench 10 is used to apply cap 60 to a threaded opening 72 of a container 70. Thus, the twisting force applied by the user to handle 20 is transmitted through dome 30 and neck ring insert 50 to cap 60 such that it is screwed onto threaded opening 72 of container 70 in a consistent and effective manner.

Neck ring insert 50 is advantageously removable from dome 30 and is replaceable therein such that insert 50 may be custom made (i.e., sized) to accommodate different sized caps. Other advantages of the present invention are that it includes no movingi parts, it is more durable than conventional manual torque wrenches, it enables easy change over of different sized neck ring inserts to accommodate different sized caps, and it enables better rib (knurl) engagement on the cap to be applied to a container due to the draft angle of the neck ring insert, than conventional torque wrenches. Moreover, in the present invention the number of parts which make up the tool is reduced, and as mentioned above rib engagement by the neck ring insert includes a draft angle which exactly matches that of the cap. This is highly significant so that the torque wrench properly engages the cap. Conventional torque wrenches fail to completely engage the caps and strip out before applying the proper torque, which subsequently causes bottle leakers.

Although the present invention has been described in connection with a preferred embodiment thereof, many other variations and modifications and other uses will become apparent to those skilled in the art without departing from the scope of the invention. It is preferred, therefore, that the present invention not be limited by the specific disclosure herein, but only by the appended claim.

What is claimed is:

1. A torque wrench for applying a screw-on cap to a threaded opening of a container, comprising:

a handle for turning the torque wrench;

a dome having at one end a continuous outwardly extending wall, the wall defining a recess located within the dome; and an annular neck ring insert fixedly received in the recess of the dome, the neck ring insert comprising an inner surface having ribs therein for releasably engaging the screw-on cap whereby torque applied to the handle is transmitted through the dome and annular neck ring insert to the cap to screw the cap onto the threaded opening of the container, the inner surface of the annular neck ring insert having an inwardly extending portion for tightly engaging an upper curved portion of the cap.

* * * * *